No. 819,613. PATENTED MAY 1, 1906.
C. P. STEINMETZ.
CONTROLLING THE SPEED OF MOTORS.
APPLICATION FILED SEPT. 26, 1902.
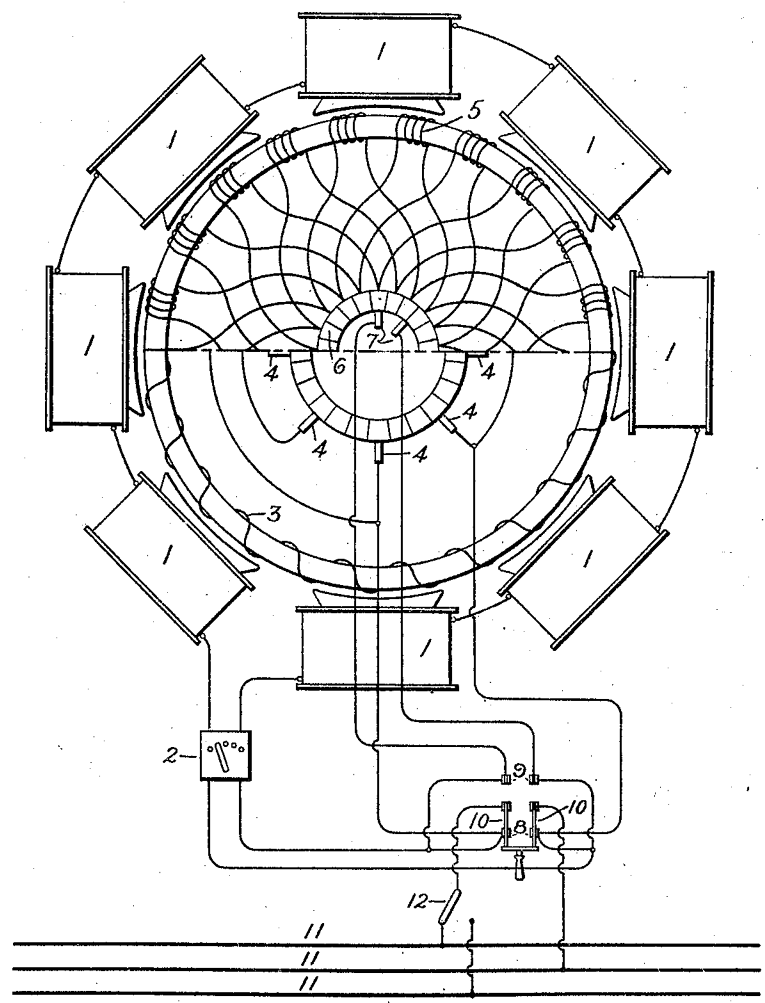
Witnesses.
George W. Tilden
Helen Orford
Inventor.
Charles P. Steinmetz.
by Albert G. Davis
Att'y.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

CONTROLLING THE SPEED OF MOTORS.

No. 819,613. Specification of Letters Patent. Patented May 1, 1906.

Application filed September 26, 1902. Serial No. 124,897.

*To all whom it may concern:*

Be it known that I, CHARLES P. STEINMETZ, a citizen of the United States, residing at Schenectady, county of Schenectady, State of New York, have invented certain new and useful Improvements in Controlling the Speed of Motors, of which the following is a specification.

This invention relates to electric motors; and its object is to enable the speed of a multipolar motor to be controlled within wide limits without the use of resistances in the circuit, which are wasteful of current.

The invention is especially applicable to motors which drive printing-presses, which have to be started and stopped frequently and run at low speed while making ready the forms and starting in the paper or in taking proof impressions, but which must run at a high speed when the press is at work.

In order to render the motor capable of meeting such service demands, I provide its armature with two windings, preferably of different resistances, and arrange a switch to cut one or the other into circuit, as desired. I also provide a rheostat for varying the field strength of the motor.

I prefer to use a multipolar motor and to make one winding a multiple-circuit or parallel winding of the ordinary type and the other a two-circuit or series winding, preferably of finer wire and having a greater number of turns than the other. In an eight-pole motor, for example, if the series winding is of the same-sized wire and has no more turns than the main winding it will give one-fourth the speed, while if it is only one-fourth the cross-section of the main wire and has four times as many turns it will give one-sixteenth the speed. Moreover, by varying the field strength a still greater regulation of speed can be obtained, or, if the three-wire system of supply is used, the motor can be connected at will to either side of the system, and so halve the speed again.

The accompanying drawing is a diagram of armature-windings and circuit connections embodying my invention as applied to an eight-pole motor.

The shunt field-coils 1 are all connected in series with each other and with a rheostat 2, by means of which the field strength can be varied. The armature carries a main winding 3 of the ordinary multiple-circuit or parallel-wound type, having, preferably, only one turn in each slot. The eight brushes 4 are connected in two sets of four each. The auxiliary two-circuit or series winding 5 has preferably four turns to each coil laid in the same slot as the main winding 3. The two-circuit winding is connected with the commutator 6 in any of the approved series or two-circuit systems, the two brushes 7 being in proper position on the commutator. The series winding is preferably of smaller wire than the main winding to give it higher resistance.

The brushes 4 7 are connected, respectively, with the stationary lower and upper contact-clips 8 9 of a double-pole double-throw switch, whose movable blades 10 are connected with the terminals of the supply-leads 11.

To start the motor slowly, the switch is closed on the contacts 9, thus energizing the series winding. By weakening the field of the motor the speed will increase up to, say, twice the original speed. This range is sufficient for the operation of getting the press ready to work. To run rapidly, the switch is closed upon the contacts 8, cutting out the series winding and energizing the parallel winding 3. By varying the field strength as before the speed due to the parallel winding can be considerably increased, if desired.

If a three-wire system of distribution is used, a switch 12 may be provided to connect the motor-leads with either side of the system at will, and thus get the variation in speed due to the difference in impressed electromotive force.

By the terms "parallel" or "multiple-circuit" winding as used in the foregoing specification and in the appended claims I intend to designate the common type of winding, in which a commutator-segment is connected to two adjacent coils, while by the terms "series" or "two-circuit" winding I mean the common type of winding in which a commutator-segment is connected to two coils displaced from each other on the armature by substantially twice the polar pitch.

What I claim as new, and desire to secure by Letters Patent of the United States, is—

1. The combination with a multipolar electric motor, of means whereby the active armature-circuit may be of the parallel-wound or series-wound type, at will, the number of poles of the motor remaining unchanged.

2. A multipolar electric motor having two armature-windings, one multiple-circuit and the other two-circuit, and a switch for including either winding in circuit at will.

3. A multipolar electric motor having two armature-windings, one parallel and the other series, means for switching either winding into circuit, and means for varying the field strength of the motor.

4. A multipolar electric motor having a main parallel-wound armature-winding, and an auxiliary series-wound winding of higher resistance than the main winding, and means for switching either winding into circuit.

In witness whereof I have hereunto set my hand this 25th day of September, 1902.

CHARLES P. STEINMETZ.

Witnesses:
HELEN ORFORD,
N. O. MILLER.